(12) United States Patent
Moriyama et al.

(10) Patent No.: US 7,134,568 B2
(45) Date of Patent: Nov. 14, 2006

(54) FUEL TANK SYSTEM

(75) Inventors: Hiroshi Moriyama, Saitama (JP); Takanori Sato, Saitama (JP); Tetsuya Arai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/133,435

(22) Filed: May 20, 2005

(65) Prior Publication Data
US 2006/0016741 A1 Jan. 26, 2006

(30) Foreign Application Priority Data
Jul. 23, 2004 (JP) ............................. 2004-215226

(51) Int. Cl.
*B65D 88/12* (2006.01)
*B01D 35/027* (2006.01)
(52) U.S. Cl. .................. 220/563; 210/251; 210/416.4
(58) Field of Classification Search ............. 210/416.4
See application file for complete search history.

(56) References Cited

U.S. PATENT DOCUMENTS

| 1,394,011 | A | * | 10/1921 | Hills | 210/172 |
| 2,261,915 | A | * | 11/1941 | Korte et al. | 417/423.3 |
| 3,648,886 | A | * | 3/1972 | Pringle | 220/723 |
| 3,701,540 | A | * | 10/1972 | Pringle | 280/834 |
| 3,756,080 | A | * | 9/1973 | Pringle | 73/290 R |
| 4,354,521 | A | * | 10/1982 | Harde | 137/571 |
| 5,547,568 | A | * | 8/1996 | Sasaki | 210/172 |
| 5,776,341 | A | * | 7/1998 | Barnard et al. | 210/306 |
| 5,924,445 | A | * | 7/1999 | Ambrose et al. | 137/549 |
| 6,283,731 | B1 | * | 9/2001 | Yoshioka | 417/423.3 |
| 6,293,420 | B1 | * | 9/2001 | Richter et al. | 220/563 |
| 6,500,338 | B1 | * | 12/2002 | Baah | 210/266 |
| 2002/0162777 | A1 | * | 11/2002 | Baah | 210/85 |
| 2004/0251194 | A1 | * | 12/2004 | Brzozowski et al. | 210/416.4 |
| 2005/0109685 | A1 | * | 5/2005 | Fujita et al. | 210/172 |
| 2006/0016741 | A1 | * | 1/2006 | Moriyama et al. | 210/172 |

FOREIGN PATENT DOCUMENTS

| JP | 55-10543 | * | 1/1980 |
| JP | 56-55050 | | 12/1981 |

* cited by examiner

*Primary Examiner*—Robert James Popovics
*Assistant Examiner*—T. Woodruff
(74) *Attorney, Agent, or Firm*—Arent Fox PLLC

(57) ABSTRACT

In a fuel tank system, a strainer chamber with a suction bore opened into its upper surface is provided in a collecting recess for collecting a residual fuel containing impure foreign substances such as dust and water, the collecting recess being provided in a bottom wall of a fuel tank. A fuel discharge pipe is connected to the strainer chamber. Fuel flow passages are provided outside the strainer chamber. Baffle plates are provided in front and in the rear of and outside the strainer chamber to guide the fuel flowing into the collecting recess during tilting of the fuel tank into the fuel flow passages. Thus, the impure foreign substances are prevented from entering the strainer chamber.

7 Claims, 9 Drawing Sheets

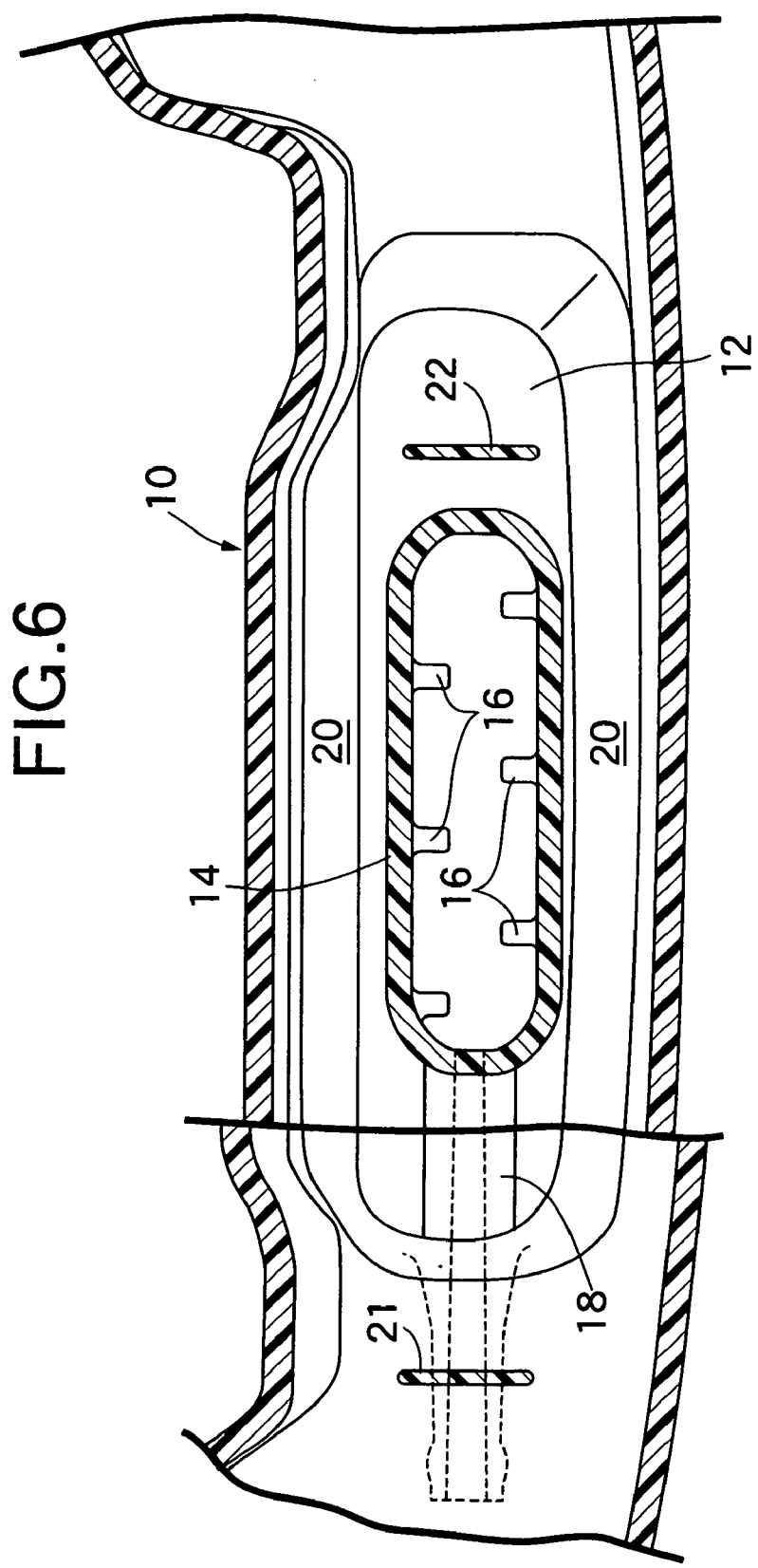

FORWARD INCLINED

REARWARD INCLINED

FUEL TANK SYSTEM

RELATED APPLICATION DATA

The present invention is based upon Japanese priority application No. 2004-215226, which is hereby incorporated in its entirety herein by reference.

BACKGROUND OF THE INVENTION

1. Field of the Invention

The present invention relates to a fuel tank for an engine mounted on a working machine of a self-propelled type such as a lawn mower, and particularly to a fuel tank system which is designed so that impure foreign substances such as water and dust incorporated in a fuel cannot be supplied to a fuel supply means in an engine, even when a fuel tank is repeatedly tilted.

2. Description of the Related Art

There is a generally known fuel tank system for an agricultural working machine of a self-propelled type, in which a fuel flow-in bore 6 communicating with a fuel tank 1 is opened, at a proper height from the bottom plate 3, into a sidewall of a discharge pipe 4 secured to a lowermost bottom plate 3 of a bottom wall of the fuel tank 1, so that dust accumulated in the bottom of the fuel tank 1 cannot be sucked into the discharge pipe 4 (see Japanese Utility Model Publication No. 56-55050).

In the fuel tank system disclosed in the above-described patent document, however, even if the fuel flow-in bore 6 of the discharge pipe 4 situates at a position higher than the bottom plate 3, it is difficult to reliably avoid that the dust accumulated on the bottom of the fuel tank 1 is sucked into the discharge pipe 4 through the fuel flow-in bore 6.

In order to eliminate the above-described drawback, a fuel tank system has been already proposed, in which a downward-depressed collecting recess for collecting dust and the like is formed in a portion of a bottom plate of a fuel tank; a strainer chamber with a suction bore opened into its upper surface is provided in the collecting recess; a fuel discharge pipe is connected to a bottom of the strainer chamber; and a fuel free of dust, after being filtered, is guided from the strainer chamber through the fuel discharge pipe to a fuel supply means for an engine, as shown in FIGS. 8 and 9.

In the proposed fuel tank system, however, there is the following problem: the strainer chamber is disposed in a narrower space in the collecting recess in the bottom of the fuel tank, and there is little space for flowing of the fuel outside the strainer chamber; thus, every time the fuel tank is tilted, the fuel containing impure foreign substances such as water and dust may collide with an end wall of the strainer chamber to splash up and pass over an upper surface of the strainer chamber; during this time, the impure foreign substances are passed through the suction bore and sucked into the strainer chamber, and then caused to flow along with the fuel to an fuel supply means such as a carburetor, thereby causing an operational failure of the fuel supply means.

SUMMARY OF THE INVENTION

Accordingly, it is an object of the present invention to provide a novel fuel tank system wherein a residual fuel containing impure foreign substances such as water and dust is always caused to flow through a fuel flow passage in a collecting recess even during tilting of a fuel tank, so that the impure foreign substances cannot be sucked into a strainer chamber.

In order to achieve the above-mentioned object, according to the present invention, there is provided a fuel tank system in which a downward-depressed collecting recess for collecting a residual fuel containing impure foreign substances is formed in a portion of a bottom wall of a fuel tank; a strainer chamber with a suction bore opened into its upper surface is provided in the collecting recess; and a fuel discharge pipe for discharging a fuel within the strainer chamber is connected to a bottom of the strainer chamber, wherein fuel flow passages permitting free flowing of the fuel therethrough are provided in the collecting recess on left and right sides of and outside the strainer chamber, and wherein baffle plates are provided in front and in the rear of and outside the strainer chamber to guide the fuel flowing into the collecting recess during tilting of the fuel tank into the fuel flow passages.

With this arrangement, the fuel flow passages permitting the free flowing of the fuel therethrough are provided on the left and right sides of and outside the strainer chamber, and the baffle plates are provided in front and in the rear of and outside the strainer chamber to guide the fuel flowing into the collecting recess during tilting of the fuel tank into the fuel flow passages. Therefore, it is possible to avoid that the residual fuel containing the impure foreign substances such as water and dust is sucked into the strainer chamber during tilting of the fuel tank, and hence it is possible to prevent the impure foreign substances from entering a fuel supply means such as a carburetor.

The above and other objects, features and advantages of the invention will become apparent from the following description of the preferred embodiment taken in conjunction with the accompanying drawings.

BRIEF DESCRIPTION OF THE DRAWINGS

FIG. 6 is a sectional view taken along a line 6—6 in FIG. 2.

DETAILED DESCRIPTION OF THE PREFERRED EMBODIMENT

The present invention will now be described by way of an embodiment with reference to the accompanying drawings.

This embodiment shows a case where a fuel tank according to the present invention is achieved in a general-purpose engine used for driving a working machine such as a lawn mower.

Figure 1:
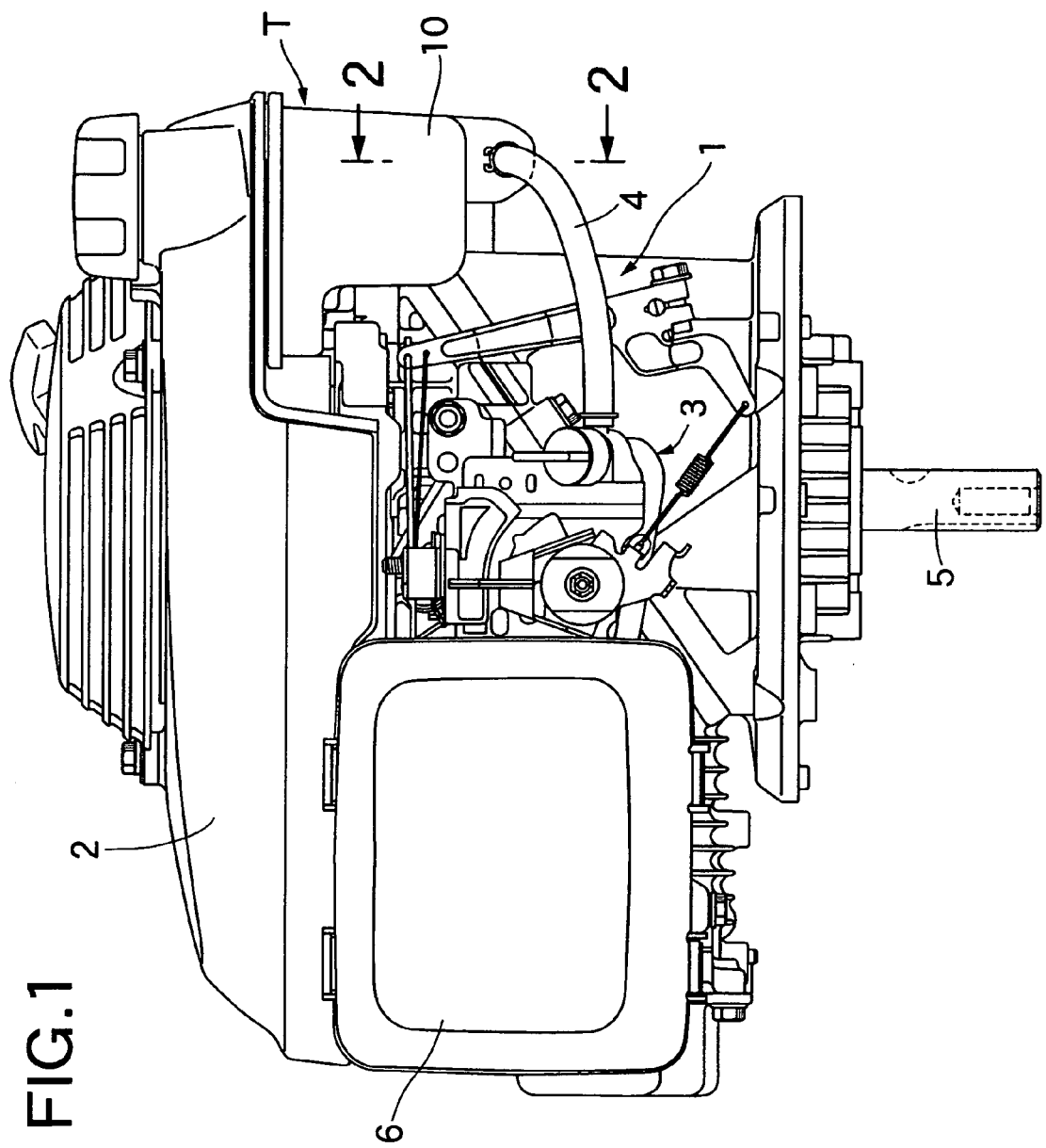
FIG. 1 is a side view of a general-purpose engine provided with a fuel tank system according to the present invention.

Referring to FIG. 1, a general-purpose engine includes an engine body 1 of a vertical air-cooled four-cycle type. A fan cover 2 is disposed above the engine body 1 to cover a fan (not shown) for feeding cooling air to the engine body 1. A fuel tank system T according to the present invention is integrally provided on one side of the fan cover 2. A carburetor 3 as a fuel supply means for supply a fuel to the engine body 1 in a controlled manner is disposed on one side of the engine body 1. A fuel outlet in the fuel tank system T and an inlet in the carburetor 3 are connected to each other by a fuel supply pipe 4. A crankshaft 5 is suspended from a lower portion of the engine body 1, and a working machine (not shown) is connected to the crankshaft 5. An air cleaner 6 is disposed on a side of the engine body 1 opposite from the fuel tank system.

The arrangement of such a fuel tank system according to the present invention will be described below with reference to FIGS. 2 to 6.

A fuel tank 10 constituting a main portion of the fuel tank system T is made of a hard synthetic resin, and formed long along one side of the engine body 1. A collecting recess 12 depressed downward is formed in a lengthwise direction in a portion of a bottom wall 10a of the fuel tank 10. Impure foreign substances having a specific gravity larger than that of the fuel, such as water and dust incorporated into the fuel during supplying of the fuel into the fuel tank 10, are deposited and stored in the collecting recess 12.

A box-shaped strainer chamber 14 is defined in a central portion of the collecting recess 12 by a wall 13 integrally rising from the bottom wall 10a of the fuel tank 10. A strainer plate 15 having a large number of suction bores 15a and comprising a mesh plate made of a stainless steel, is welded to an open upper surface of the strainer chamber 14. A plurality of vertical ribs 16 are integrally formed on an inner surface of the strainer chamber 14, so that the strainer chamber 14 is reinforced by the vertical ribs 16. A fuel discharge pipe 18 is integrally formed at a lower portion of a lengthwise one end wall of the strainer chamber 14. The fuel discharge pipe 18 is extended to the outside through the fuel tank 10 and connected at its outer end to the fuel supply pipe 4 (see FIG. 1).

Figure 3:
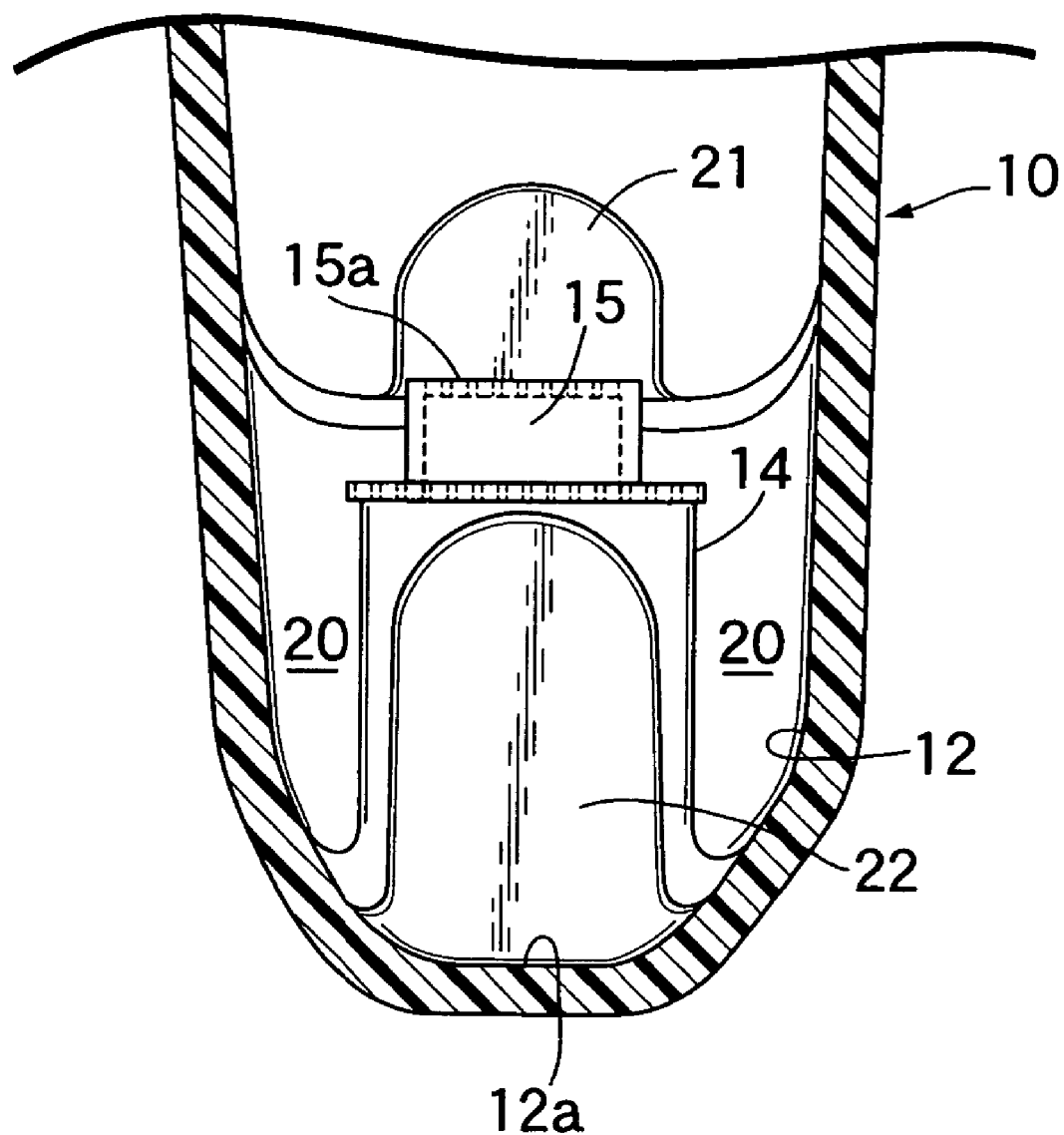
FIG. 3 is a sectional view taken along a line 3—3 in FIG. 2.
Figure 4:
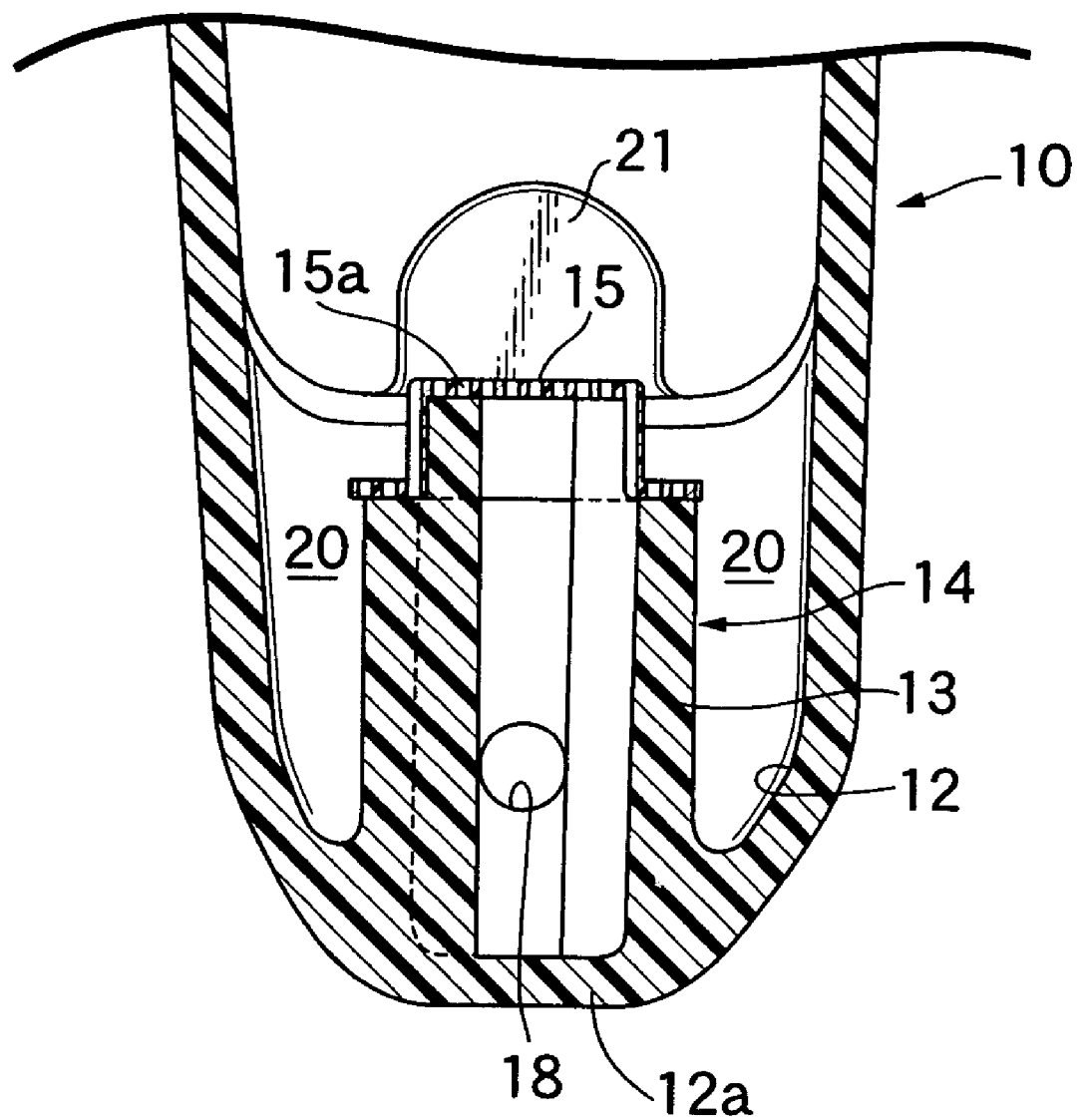
FIG. 4 is a sectional view taken along a line 4—4 in FIG. 2.

As shown in FIGS. 3 and 4, left and right fuel flow passages 20, 20 are symmetrically formed in longitudinal directions in the strainer chamber 14 on the left and right sides of the strainer chamber 14, and communicate with each other in front and rear portions of the collecting recess 12. Thus, the residual fuel containing the impure foreign substances such as water and dust flows freely in the longitudinal directions within the left and right fuel flow passages 20, 20 around the strainer chamber 14.

Figure 2:
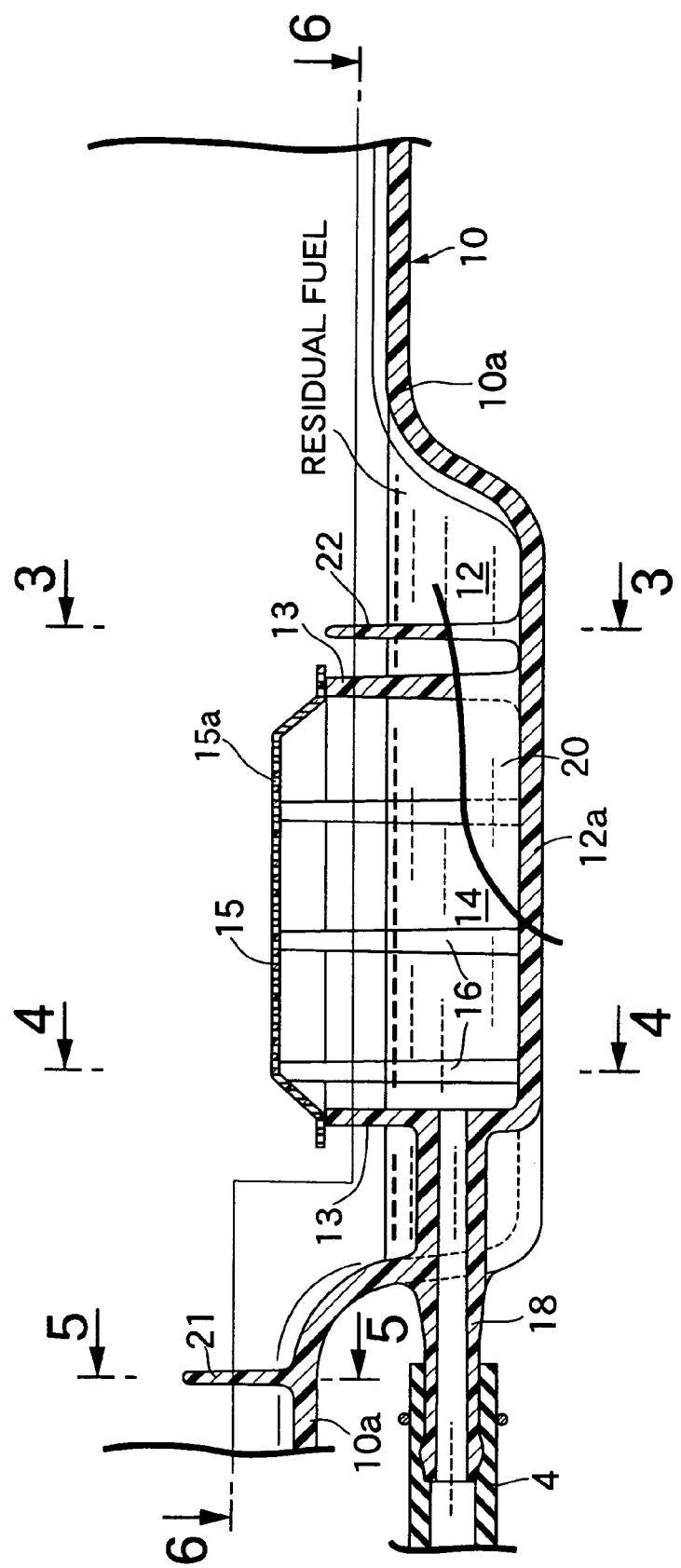
FIG. 2 is an enlarged sectional view of essential portions of a fuel tank, taken along a line 2—2 in FIG. 1.
Figure 5:
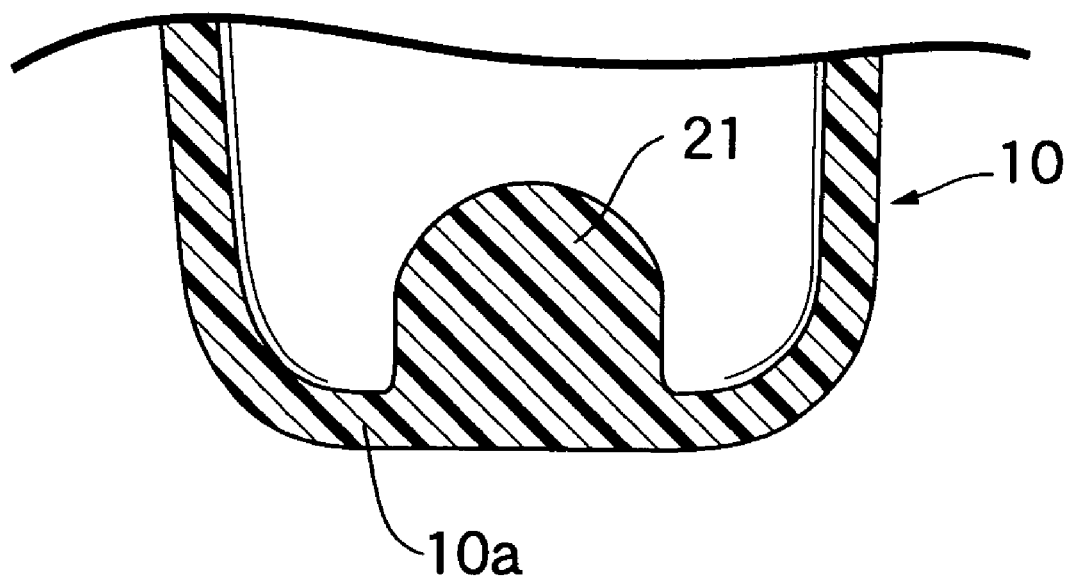
FIG. 5 is a sectional view taken along a line 5—5 in FIG. 2.

As shown in FIGS. 2 and 5, a front baffle plate 21 is provided in front of the strainer chamber 14, so that it confronts a front end face of the strainer chamber 14 and is substantially perpendicular to the left and right fuel flow passages 20, 20. The front baffle plate 21 is formed at a boundary site of the collecting recess 12 to integrally rise from the bottom wall 10a of the fuel tank 10. A rear baffle plate 22 is also provided in the rear of the strainer chamber 14, so that it confronts a rear end face of the strainer chamber 14 and is substantially perpendicular to the left and right fuel flow passages 20, 20. The rear baffle plate 22 is formed to integrally rise from a bottom wall 12a of the collecting recess 12.

The operation of this embodiment will be described below.

The residual fuel containing the impure foreign substances such as water and dust entering into the fuel tank 10 during supply of the fuel the tank 10 is stored, as a fuel not to be used, in the collecting recess 12 in the fuel tank 10.

Figure 7A:
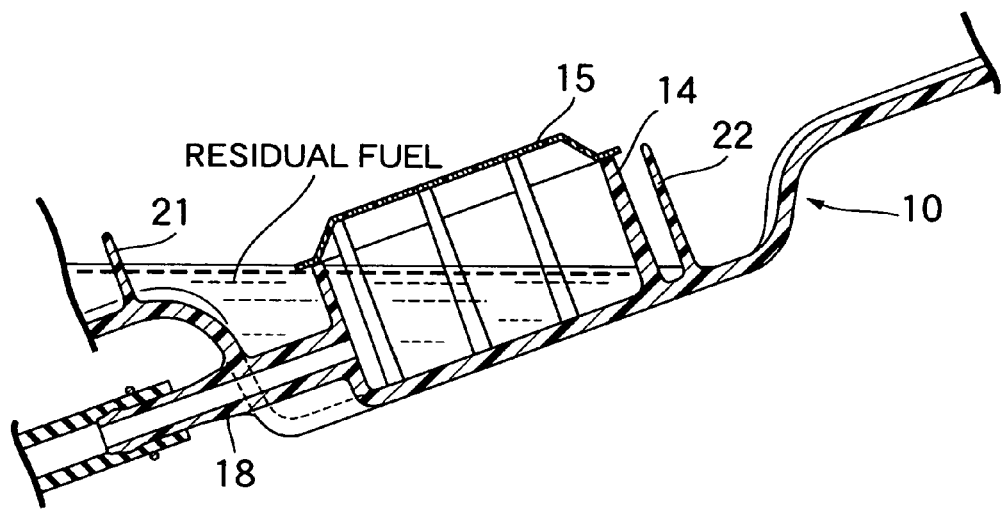
FIG. 7 is a view for explaining an operation of the fuel tank system according to the present invention.
Figure 7B:
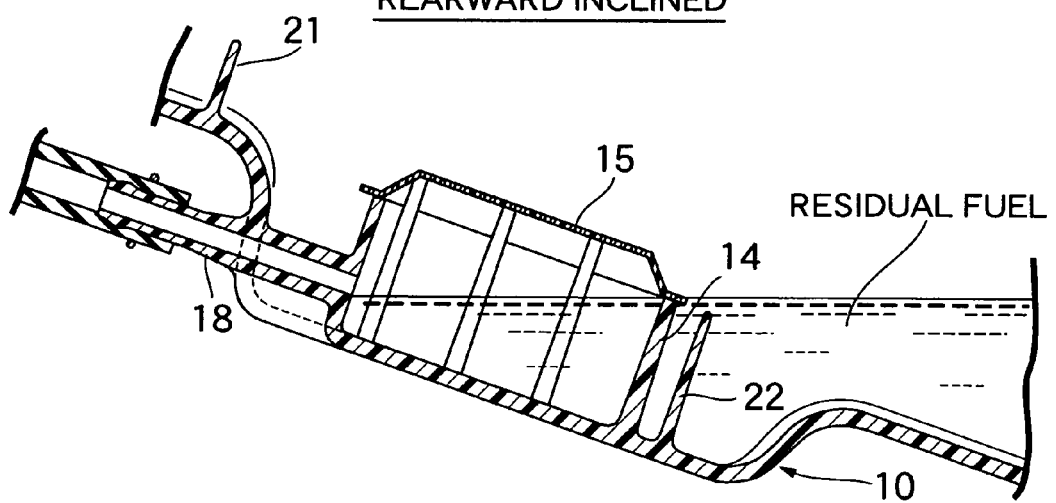
Figure 8:
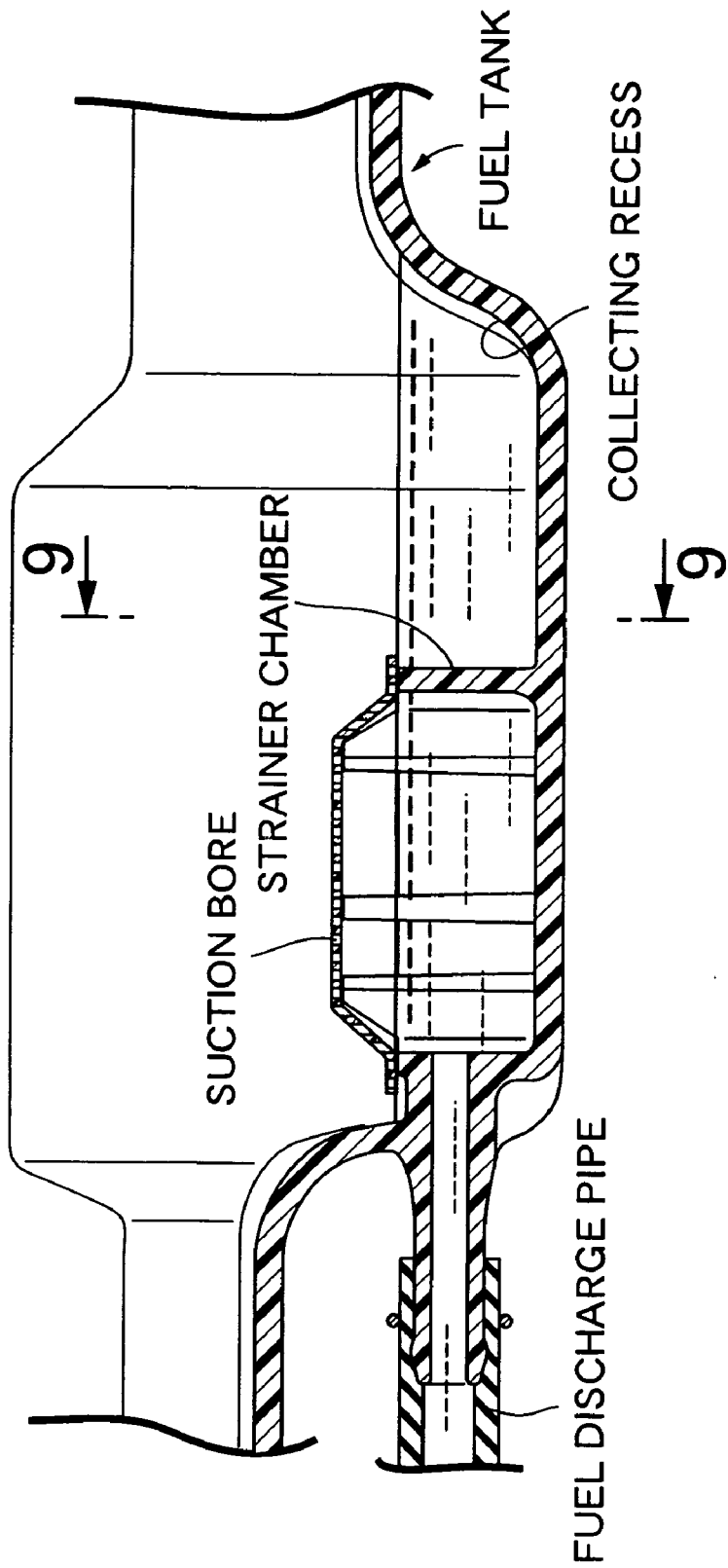
FIG. 8 is a sectional view of a conventional fuel tank system.
Figure 9:
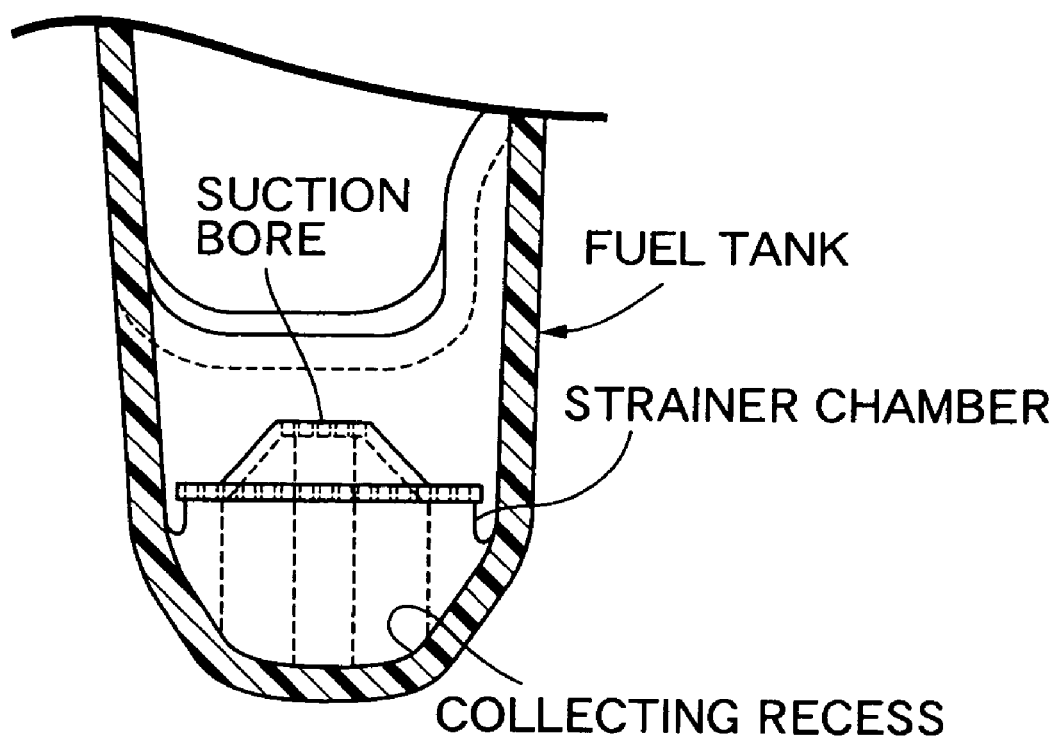
FIG. 9 is a sectional view taken along a line 9—9 in FIG. 8.

Now, when the fuel tank 10 is repeatedly tilted in the longitudinal direction if its position is changed from a forward inclined position shown in FIG. 7A to a rearward inclined position shown in FIG. 7B, the residual fuel accumulated on the front portion in the collecting recess 12 is moved to the rear portion of the collecting recess 12. During this time, it is avoided that the moved fuel directly collides with the end wall of the strainer chamber 14 to splash up, and thus the moved fuel can be guided in a detouring manner to the left and right fuel flow passages 20, 20. Also, if the position of the fuel tank 10 is changed from the rearward inclined position shown in FIG. 7B to the forward inclined position shown in FIG. 7A, the residual fuel accumulated on the rear portion in the collecting recess 12 is moved to the front portion of the collecting recess 12. During this time, it is avoided that the moved fuel directly collides with the end wall of the strainer chamber 14 to splash up, and thus the moved fuel can be guided in a detouring manner to the left and right fuel flow passages 20, 20. Therefore, when the fuel tank 10 is inclined forward and rearward, it is possible to avoid that the residual fuel containing the impure foreign substances directly collides with the end wall of the strainer chamber 14 to splash up and flows on the upper surface of the strainer chamber 14, and it is possible to prevent the impure foreign substances from being sucked into the carburetor 3 from the strainer chamber 14.

Although the embodiment of the present invention has been described in detail, it will be understood that the present invention is not limited to the above-described embodiment, and various modifications in design may be made without departing from the subject matter of the invention.

For example, the embodiment of the fuel tank system according to the present invention has been described as being achieved in the general-purpose engine for the working machine, but can be of course achieved in another engine for a vehicle and the like.

What is claimed is:

1. A fuel tank system in which a downward-depressed collecting recess for collecting a residual fuel containing impure foreign substances is formed in a portion of a bottom wall of a fuel tank; a strainer chamber is provided in the collecting recess, the strainer chamber includes a wall integral with and extending upward away from the bottom wall of the fuel tank, and an upper surface of the strainer chamber, which is defined by a strainer plate having at least one suction bore defined therein; and a fuel discharge pipe for discharging a fuel within the strainer chamber is connected to a bottom of the strainer chamber, wherein fuel flow passages permitting free flowing of the fuel therethrough are provided in the collecting recess on left and right sides of and outside the strainer chamber, and wherein baffle plates are provided in front and in the rear of and outside the strainer chamber to guide the fuel flowing into the collecting recess during tilting of the fuel tank into the fuel flow passages.

2. The fuel tank system according to claim 1, wherein the strainer chamber is box-shaped and is provided in a center of the collecting recess.

3. The fuel tank system according to claim 1, wherein the wall has an upper surface, and the strainer plate is stainless steel and welded to the upper surface of the wall.

4. The fuel tank system according to claim 1, further comprising a plurality of ribs integrally formed on an inner surface of the wall.

5. The fuel tank system according to claim 4, wherein the ribs extend from the bottom wall of the fuel tank.

6. The fuel tank system according to claim 1, wherein the baffle plates are substantially perpendicular relative to a flow direction in which the fuel flows through the fuel flow passages.

7. The fuel tank system according to claim 1, wherein the baffle plates are integral with and extend away from the bottom wall of the fuel tank.

* * * * *